US009225527B1

(12) United States Patent
Chang

(10) Patent No.: US 9,225,527 B1
(45) Date of Patent: *Dec. 29, 2015

(54) HIDDEN PLUG-IN STORAGE DRIVE FOR DATA INTEGRITY

(71) Applicant: Coban Technologies, Inc., Houston, TX (US)

(72) Inventor: Hung C Chang, Sugar Land, TX (US)

(73) Assignee: Coban Technologies, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/588,139

(22) Filed: Dec. 31, 2014

Related U.S. Application Data

(60) Provisional application No. 62/044,139, filed on Aug. 29, 2014.

(51) Int. Cl.
G06F 7/04 (2006.01)
G06F 17/30 (2006.01)
G06F 15/16 (2006.01)
(Continued)

(52) U.S. Cl.
CPC .......... *H04L 9/3242* (2013.01); *G06F 12/0246* (2013.01); *G06F 12/1408* (2013.01); *H04L 9/3231* (2013.01); *G06F 2212/1052* (2013.01); *G06F 2212/7207* (2013.01)

(58) Field of Classification Search
CPC ....... H04L 9/32; H04L 9/3242; H04L 9/3231; G06F 21/78; G06F 21/31; G06F 12/0246; G06F 12/1408
USPC .......................... 726/17–19, 21, 26–30, 34–35
See application file for complete search history.

(56) References Cited

U.S. PATENT DOCUMENTS 4,344,184 A 8/1982 Edwards
4,543,665 A 9/1985 Sotelo et al.
(Continued)

FOREIGN PATENT DOCUMENTS

CN 2907145 Y 5/2007
CN 101309088 A 11/2008
(Continued)

OTHER PUBLICATIONS

Office Action issued in U.S. Appl. No. 11/369,502 on Mar. 16, 2010.
(Continued)

*Primary Examiner* — Shewaye Gelagay
*Assistant Examiner* — Trong Nguyen
(74) *Attorney, Agent, or Firm* — Chowdhury Law Group, P.C.

(57) ABSTRACT

A secure (e.g., protected) storage drive for use with an associated computer device is disclosed. The secure storage drive allows access only when properly authenticated to the computer device attempting to access the secure storage drive. Additionally, other levels of authentication may be required prior to allowing access. For example, access may only be allowed if both the computer device and a user authenticated to the computer device are recognized by the secure storage drive. If access to the secure storage drive is not permitted, then the secure storage drive may remain hidden and not accessible to the operating system of the computer device. Accordingly, if hidden, no command of the operating system of the computer device can access, alter, or erase data on the secure storage drive.

23 Claims, 6 Drawing Sheets

(51) Int. Cl.
  *G06F 11/30* (2006.01)
  *G06F 12/14* (2006.01)
  *H04N 7/16* (2011.01)
  *H04L 29/06* (2006.01)
  *H04L 9/32* (2006.01)
  *G06F 12/02* (2006.01)

(56) References Cited

U.S. PATENT DOCUMENTS

| | | | |
|---|---|---|---|
| 4,590,614 A | 5/1986 | Erat | |
| 4,910,795 A | 3/1990 | McCowen et al. | |
| 5,012,335 A | 4/1991 | Cohodar | |
| 5,111,289 A | 5/1992 | Lucas et al. | |
| 5,408,330 A | 4/1995 | Squicciarini et al. | |
| 5,477,397 A | 12/1995 | Naimpally et al. | |
| 5,613,032 A | 3/1997 | Cruz et al. | |
| 5,724,475 A | 3/1998 | Kirsten | |
| 5,815,093 A | 9/1998 | Kikinis | |
| 5,841,978 A | 11/1998 | Rhoads | |
| 5,862,260 A | 1/1999 | Rhoads | |
| 5,926,218 A | 7/1999 | Smith | |
| 5,946,343 A | 8/1999 | Schotz et al. | |
| 5,970,098 A | 10/1999 | Herzberg | |
| 6,002,326 A | 12/1999 | Turner | |
| 6,009,229 A | 12/1999 | Kawamura | |
| 6,028,528 A | 2/2000 | Lorenzetti et al. | |
| 6,038,257 A | 3/2000 | Brusewitz et al. | |
| 6,122,403 A | 9/2000 | Rhoads | |
| 6,141,611 A | 10/2000 | Mackey et al. | |
| 6,163,338 A | 12/2000 | Johnson et al. | |
| 6,175,860 B1 | 1/2001 | Gaucher | |
| 6,275,773 B1 | 8/2001 | Lemelson et al. | |
| 6,298,290 B1 | 10/2001 | Abe et al. | |
| 6,346,965 B1 | 2/2002 | Toh | |
| 6,411,874 B2 | 6/2002 | Morgan et al. | |
| 6,421,080 B1 | 7/2002 | Lambert | |
| 6,424,820 B1 | 7/2002 | Burdick et al. | |
| 6,462,778 B1 | 10/2002 | Abram et al. | |
| 6,505,160 B1 | 1/2003 | Levy et al. | |
| 6,510,177 B1 | 1/2003 | De Bonet et al. | |
| 6,518,881 B2 | 2/2003 | Monroe | |
| 6,624,611 B2 | 9/2003 | Kirmuss | |
| 6,778,814 B2 | 8/2004 | Koike | |
| 6,788,338 B1 | 9/2004 | Dinev et al. | |
| 6,788,983 B2 | 9/2004 | Zheng | |
| 6,789,030 B1 | 9/2004 | Coyle et al. | |
| 6,791,922 B2 | 9/2004 | Suzuki | |
| 6,825,780 B2 | 11/2004 | Saunders et al. | |
| 6,831,556 B1 | 12/2004 | Boykin | |
| 7,010,328 B2 | 3/2006 | Kawasaki et al. | |
| 7,091,851 B2 | 8/2006 | Mason et al. | |
| 7,119,832 B2 | 10/2006 | Blanco et al. | |
| 7,120,477 B2 | 10/2006 | Huang | |
| 7,155,615 B1 * | 12/2006 | Silvester | 713/185 |
| 7,167,519 B2 | 1/2007 | Comaniciu et al. | |
| 7,190,882 B2 | 3/2007 | Gammenthaler | |
| 7,231,233 B2 | 6/2007 | Gosieski, Jr. | |
| 7,272,179 B2 | 9/2007 | Siemens et al. | |
| 7,317,837 B2 | 1/2008 | Yatabe et al. | |
| 7,356,473 B2 | 4/2008 | Kates | |
| 7,386,219 B2 | 6/2008 | Ishige | |
| 7,410,371 B2 | 8/2008 | Shabtai et al. | |
| 7,414,587 B2 | 8/2008 | Stanton | |
| 7,428,314 B2 | 9/2008 | Henson | |
| 7,515,760 B2 | 4/2009 | Sai et al. | |
| 7,542,813 B2 | 6/2009 | Nam | |
| 7,551,894 B2 | 6/2009 | Gerber et al. | |
| 7,554,587 B2 | 6/2009 | Shizukuishi | |
| 7,618,260 B2 | 11/2009 | Daniel et al. | |
| 7,631,195 B1 * | 12/2009 | Yu et al. | 713/189 |
| 7,688,203 B2 | 3/2010 | Rockefeller et al. | |
| 7,693,289 B2 | 4/2010 | Stathem et al. | |
| 7,768,548 B2 | 8/2010 | Silvernail et al. | |
| 7,778,601 B2 | 8/2010 | Seshadri et al. | |
| 7,792,189 B2 | 9/2010 | Finizio et al. | |
| 7,818,078 B2 | 10/2010 | Iriarte | |
| 7,835,530 B2 | 11/2010 | Avigni | |
| 7,868,912 B2 | 1/2011 | Venetianer et al. | |
| 7,877,115 B2 | 1/2011 | Seshadri et al. | |
| 7,974,429 B2 | 7/2011 | Tsai | |
| 7,995,652 B2 | 8/2011 | Washington | |
| 8,068,023 B2 | 11/2011 | Dulin et al. | |
| 8,081,214 B2 | 12/2011 | Vanman et al. | |
| 8,086,277 B2 | 12/2011 | Ganley et al. | |
| 8,121,306 B2 | 2/2012 | Cilia et al. | |
| 8,126,276 B2 | 2/2012 | Bolle et al. | |
| 8,126,968 B2 | 2/2012 | Rodman et al. | |
| 8,139,796 B2 | 3/2012 | Nakashima et al. | |
| 8,144,892 B2 | 3/2012 | Shemesh et al. | |
| 8,145,134 B2 | 3/2012 | Henry et al. | |
| 8,150,089 B2 | 4/2012 | Segawa et al. | |
| 8,154,666 B2 | 4/2012 | Mody | |
| 8,166,220 B2 | 4/2012 | Ben-Yacov et al. | |
| 8,174,577 B2 | 5/2012 | Chou | |
| 8,195,145 B2 | 6/2012 | Angelhag | |
| 8,208,024 B2 | 6/2012 | Dischinger | |
| 8,228,364 B2 | 7/2012 | Cilia | |
| 8,253,796 B2 | 8/2012 | Renkis | |
| 8,254,844 B2 | 8/2012 | Kuffner et al. | |
| 8,260,217 B2 | 9/2012 | Chang et al. | |
| 8,264,540 B2 | 9/2012 | Chang et al. | |
| 8,270,647 B2 | 9/2012 | Crawford et al. | |
| 8,289,370 B2 | 10/2012 | Civanlar et al. | |
| 8,300,863 B2 | 10/2012 | Knudsen et al. | |
| 8,311,549 B2 | 11/2012 | Chang et al. | |
| 8,311,983 B2 | 11/2012 | Guzik | |
| 8,358,980 B2 | 1/2013 | Tajima et al. | |
| 8,380,131 B2 | 2/2013 | Chiang | |
| 8,422,944 B2 | 4/2013 | Flygh et al. | |
| 8,446,469 B2 | 5/2013 | Blanco et al. | |
| 8,489,065 B2 | 7/2013 | Green et al. | |
| 8,489,151 B2 | 7/2013 | Engelen et al. | |
| 8,497,940 B2 | 7/2013 | Green et al. | |
| 8,554,145 B2 | 10/2013 | Fehr | |
| 8,612,708 B2 | 12/2013 | Drosch | |
| 8,630,908 B2 | 1/2014 | Forster | |
| 8,661,507 B1 | 2/2014 | Hesselink et al. | |
| 8,707,392 B2 | 4/2014 | Birtwhistle et al. | |
| 8,780,199 B2 | 7/2014 | Mimar | |
| 9,041,803 B2 | 5/2015 | Chen et al. | |
| 2002/0051061 A1 | 5/2002 | Peters et al. | |
| 2002/0135679 A1 | 9/2002 | Scaman | |
| 2003/0052970 A1 | 3/2003 | Dodds et al. | |
| 2003/0080878 A1 | 5/2003 | Kirmuss | |
| 2003/0081127 A1 | 5/2003 | Kirmuss | |
| 2003/0081935 A1 | 5/2003 | Kirmuss | |
| 2003/0095688 A1 | 5/2003 | Kirmuss | |
| 2003/0103140 A1 | 6/2003 | Watkins | |
| 2003/0151663 A1 | 8/2003 | Lorenzetti et al. | |
| 2003/0197629 A1 | 10/2003 | Saunders et al. | |
| 2004/0008255 A1 | 1/2004 | Lewellen | |
| 2004/0051793 A1 | 3/2004 | Tecu et al. | |
| 2004/0146272 A1 | 7/2004 | Kessel et al. | |
| 2004/0177253 A1 | 9/2004 | Wu et al. | |
| 2005/0007458 A1 | 1/2005 | Benattou | |
| 2005/0083404 A1 | 4/2005 | Pierce et al. | |
| 2005/0088521 A1 | 4/2005 | Blanco et al. | |
| 2005/0122397 A1 | 6/2005 | Henson et al. | |
| 2005/0154907 A1 | 7/2005 | Han et al. | |
| 2005/0185936 A9 | 8/2005 | Lao et al. | |
| 2005/0243171 A1 | 11/2005 | Ross, Sr. et al. | |
| 2006/0055521 A1 | 3/2006 | Blanco et al. | |
| 2006/0072672 A1 | 4/2006 | Holcomb et al. | |
| 2006/0077256 A1 | 4/2006 | Silvemail et al. | |
| 2006/0078046 A1 | 4/2006 | Lu | |
| 2006/0130129 A1 | 6/2006 | Dai et al. | |
| 2006/0133476 A1 | 6/2006 | Page et al. | |
| 2006/0165386 A1 | 7/2006 | Garoutte | |
| 2006/0270465 A1 | 11/2006 | Lee et al. | |
| 2006/0274116 A1 | 12/2006 | Wu | |
| 2007/0064108 A1 | 3/2007 | Haler | |
| 2007/0086601 A1 | 4/2007 | Mitchler | |
| 2007/0111754 A1 | 5/2007 | Marshall et al. | |

(56) References Cited

U.S. PATENT DOCUMENTS

| | | | |
|---|---|---|---|
| 2007/0124292 A1 | 5/2007 | Kirshenbaum et al. | |
| 2007/0217761 A1 | 9/2007 | Chen et al. | |
| 2008/0005472 A1 | 1/2008 | Khalidi et al. | |
| 2008/0030782 A1 | 2/2008 | Watanabe | |
| 2008/0129825 A1 | 6/2008 | DeAngelis et al. | |
| 2008/0165250 A1 | 7/2008 | Ekdahl et al. | |
| 2008/0186129 A1 | 8/2008 | Fitzgibbon | |
| 2008/0208755 A1 | 8/2008 | Malcolm | |
| 2009/0017881 A1 | 1/2009 | Madrigal | |
| 2009/0074216 A1 | 3/2009 | Bradford et al. | |
| 2009/0076636 A1 | 3/2009 | Bradford et al. | |
| 2009/0195651 A1 | 8/2009 | Leonard et al. | |
| 2009/0213902 A1 | 8/2009 | Jeng | |
| 2010/0026809 A1 | 2/2010 | Curry | |
| 2010/0030929 A1* | 2/2010 | Ben-Yacov et al. | 710/33 |
| 2010/0057444 A1 | 3/2010 | Cilia | |
| 2010/0081466 A1 | 4/2010 | Mao | |
| 2010/0131748 A1 | 5/2010 | Lin | |
| 2010/0180051 A1 | 7/2010 | Harris | |
| 2010/0287545 A1 | 11/2010 | Corbefin | |
| 2010/0289648 A1 | 11/2010 | Ree | |
| 2010/0302979 A1 | 12/2010 | Reunamaki | |
| 2010/0309971 A1 | 12/2010 | Vanman et al. | |
| 2011/0044605 A1 | 2/2011 | Vanman et al. | |
| 2011/0142156 A1 | 6/2011 | Haartsen | |
| 2011/0233078 A1 | 9/2011 | Monaco et al. | |
| 2011/0234379 A1 | 9/2011 | Lee | |
| 2011/0280143 A1 | 11/2011 | Li et al. | |
| 2011/0280413 A1 | 11/2011 | Wu et al. | |
| 2011/0299457 A1 | 12/2011 | Green, III et al. | |
| 2012/0014534 A1 | 1/2012 | Bodley et al. | |
| 2012/0078397 A1 | 3/2012 | Lee et al. | |
| 2012/0163309 A1 | 6/2012 | Ma et al. | |
| 2012/0266251 A1 | 10/2012 | Birtwhistle et al. | |
| 2012/0307070 A1 | 12/2012 | Pierce | |
| 2012/0310394 A1 | 12/2012 | El-Hoiydi | |
| 2012/0310395 A1 | 12/2012 | El-Hoiydi | |
| 2013/0201884 A1 | 8/2013 | Freda et al. | |
| 2013/0223653 A1 | 8/2013 | Chang | |
| 2013/0236160 A1 | 9/2013 | Gentile et al. | |
| 2013/0242262 A1 | 9/2013 | Lewis | |
| 2013/0251173 A1 | 9/2013 | Ejima et al. | |
| 2013/0268357 A1 | 10/2013 | Heath | |
| 2013/0339447 A1 | 12/2013 | Ervine | |
| 2014/0078304 A1 | 3/2014 | Othmer | |
| 2014/0092251 A1 | 4/2014 | Troxel | |
| 2014/0143545 A1* | 5/2014 | McKeeman et al. | 713/168 |
| 2014/0162598 A1 | 6/2014 | Villa-Real | |
| 2014/0280584 A1 | 9/2014 | Ervine | |
| 2014/0281498 A1 | 9/2014 | Bransom et al. | |
| 2015/0032535 A1 | 1/2015 | Li et al. | |

FOREIGN PATENT DOCUMENTS

| | | |
|---|---|---|
| CN | 102355618 A | 2/2012 |
| CN | 102932703 A | 2/2013 |
| CN | 202957973 U | 5/2013 |
| CN | 103617005 A | 3/2014 |
| EP | 1148726 A2 | 10/2001 |
| EP | 1655855 A1 | 5/2006 |
| EP | 2107837 A1 | 10/2009 |
| GB | 2391687 A | 11/2004 |
| JP | 2003150450 A | 5/2003 |
| JP | 2005266934 A | 9/2005 |
| JP | 2009169922 A | 7/2009 |
| JP | 2012058832 A | 3/2012 |
| WO | 9738526 A1 | 10/1997 |
| WO | 0013410 A1 | 3/2000 |
| WO | 0021258 A1 | 4/2000 |
| WO | 0045587 A2 | 8/2000 |
| WO | 0072186 A2 | 11/2000 |
| WO | 02061955 A2 | 8/2002 |
| WO | 2004066590 | 8/2004 |
| WO | 2004111851 A1 | 12/2004 |
| WO | 2005053325 A2 | 6/2005 |
| WO | 2005054997 A2 | 6/2005 |
| WO | 2007114988 | 10/2007 |
| WO | 2009058611 A1 | 5/2009 |
| WO | 20090148374 A1 | 12/2009 |
| WO | 2012001143 A1 | 1/2012 |
| WO | 2012100114 A2 | 7/2012 |
| WO | 2012116123 A2 | 8/2012 |
| WO | 2013020588 A1 | 2/2013 |
| WO | 2013074947 A2 | 5/2013 |
| WO | 2013106740 A2 | 7/2013 |
| WO | 2013107516 A1 | 7/2013 |
| WO | 2013150326 A1 | 10/2013 |

OTHER PUBLICATIONS

Office Action issued in U.S. Appl. No. 11/369,502 on Sep. 30, 2010.
Office Action issued in U.S. Appl. No. 11/369,502 on Jul. 14, 2011.
Office Action issued in U.S. Appl. No. 11/369,502 on Jan. 31, 2012.
Examiner's Answer (to Appeal Brief) issued in U.S. Appl. No. 11/369,502 on Oct. 24, 2012.
Office Action issued in U.S. Appl. No. 13/723,747 on Mar. 22, 2013.
Office Action issued in U.S. Appl. No. 13/723,747 on Jun. 26, 2013.
Office Action issued in U.S. Appl. No. 13/723,747 on Sep. 10, 2013.
Advisory Action issued in U.S. Appl. No. 13/723,747 on Feb. 24, 2014.
Office Action issued in U.S. Appl. No. 13/723,747 on Mar. 20, 2014.
Office Action issued in U.S. Appl. No. 13/723,747 on Nov. 10, 2014.
Notice of Allowance and Fees Due issued in U.S. Appl. No. 13/723,747 on Mar. 30, 2015.
Office Action issued in U.S. Appl. No. 14/593,722 on Apr. 10, 2015.
Office Action issued in U.S. Appl. No. 14/593,853 on Apr. 20, 2015.
Office Action issued in U.S. Appl. No. 14/593,956 on May 6, 2015.
PCT International Search Report and Written Opinion issued in Application No. PCT/US07/63485 on Feb. 8, 2008, 10 pages.
"Portable Application," Wikipedia, Jun. 26, 2014, 4 pages, available at: http://en.wikipedia.org/w/index.php?title=Portable_application&oldid=614543759.
"Radio-Frequency Identification," Wikipedia, Oct. 18, 2013, 31 pages, available at: http://en.wikipedia.org/w/index.php?title=Radio-frequency_identification&oldid=577711262.
"Near Field Communication," Wikipedia, Jul. 19, 2014, 8 pages, available at: https://en.wikipedia.org/w/index.php?title=near_field_communication&oldid=617538619.
Gregory J. Allen, "The Feasibility of Implementing Video Teleconferencing Systems Aboard Afloat Naval Units" (Master's Thesis, Naval Postgraduate School, Monterey, California), Mar. 1990, 143 pages.
Bell-Northern Research Ltd., "A Multi-Bid Rate Interframe Movement Compensated Multimode Coder for Video Conferencing" (Final Report prepared for DARPA), Apr. 1982, 92 pages, Ottawa, Ontario, Canada.
Xiaoqing Zhu, Eric Setton, Bernd Girod, "Rate Allocation for Multi-Camera Surveillance Over an Ad Hoc Wireless Network," 2004, 6 pages, available at http://msw3.stanford.edu/~zhuxq/papers/pcs2004.pdf.
Chapter 5: "Main Memory," Introduction to Computer Science course, 2004, 20 pages, available at http://www2.cs.ucy.ac.cy/~nicolast/courses/lectures/MainMemory.pdf.
Sony Corporation, Digital Still Camera (MVC-CD200/CD300), Operation Manual, 2001, 108 pages, Sony, Japan.
Steve'S Digicams, Kodak Professional DCS 620 Digital Camera, 1999, 11 pages, United States, available at: http://www.steves-digicams.com/dcs620.html.
Office Action issued in U.S. Appl. No. 14/593,722 on Sep. 25, 2015, 39 pages.
Office Action issued in U.S. Appl. No. 14/715,742 on Aug. 21, 2015, 13 pages.
Office Action issued in U.S. Appl. No. 14/593,853 on Sep. 11, 2015, 48 pages.
Notice of Allowance issued in U.S. Appl. No. 14/593,956 on Oct. 26, 2015, 10 pages.
"IEEE 802.1X," Wikipedia, Aug. 23, 2013, 8 pages, available at: http://en.wikipedia.org/w/index.php?title=IEEE_802.1X&oldid=569887090.

* cited by examiner

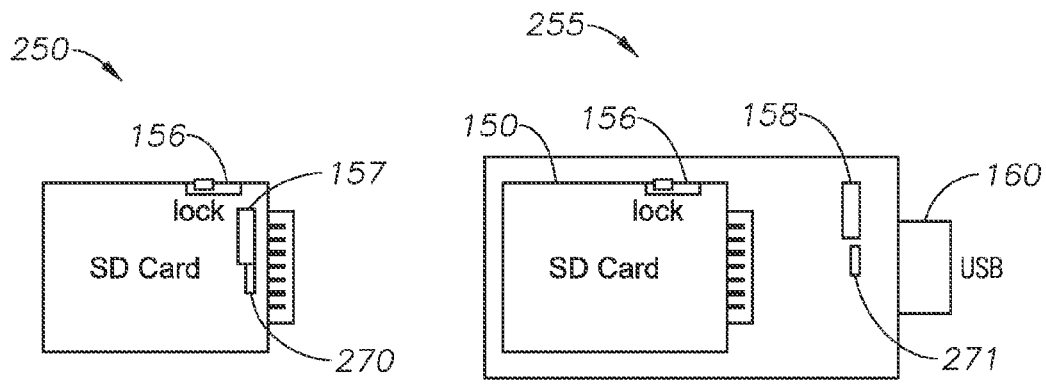
FIG. 2A
FIG. 2B
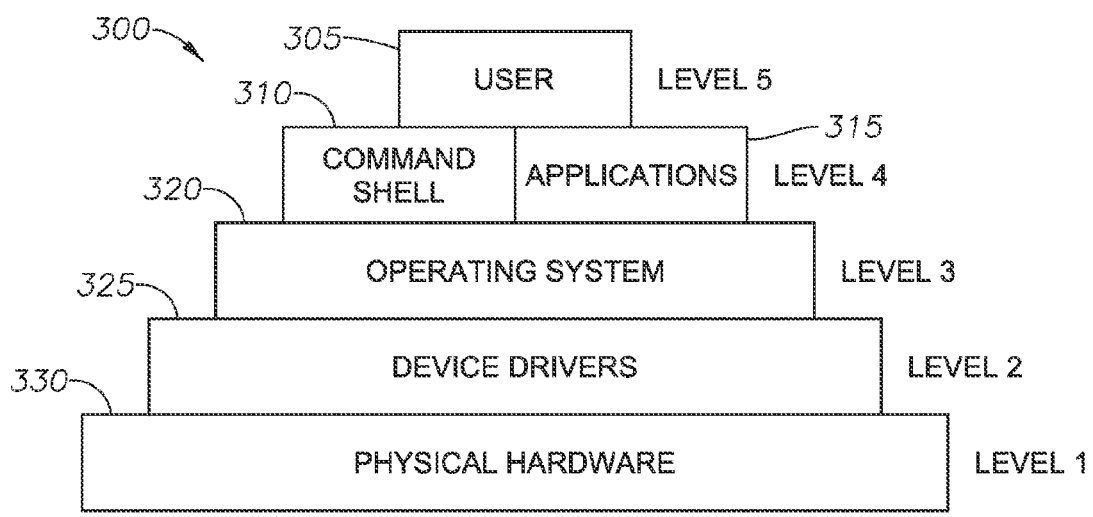
FIG. 3

HIDDEN PLUG-IN STORAGE DRIVE FOR DATA INTEGRITY

CROSS-REFERENCE TO RELATED APPLICATIONS

This application claims the benefit of, and priority to, U.S. Provisional Application No. 62/044,139, filed Aug. 29, 2014, and entitled, "Compact Multi-Function DVR with Multiple Integrated Wireless Data Communication Devices," which is incorporated herein by reference.

TECHNICAL FIELD OF THE INVENTION

This disclosure relates generally to storage devices that are pre-configured to prevent unauthenticated access. More particularly, this disclosure relates to a pre-configured storage device that interacts with a computer system in a standard manner when properly authenticated and remains "hidden" to the computer system when not properly authenticated.

SUMMARY

According to a first aspect of the invention, a storage device for storing digital data is disclosed. The storage device includes, in one embodiment, a flash memory storage area and two portions of firmware instructions that may be combined into a single set of instructions. The first portion of firmware instructions are used to control access to a secure storage drive. The first portion of firmware instructions also have access to unhide information stored on the secure storage drive. The unhide information may be used to unhide the secure storage drive so that it may be visible to an attached computer system. The second portion of firmware instructions may be used to control access to the flash memory storage area where data of the storage device may be stored. The storage device may also be configured with a data access controller configured to utilize the first and second portions of firmware instructions to control access to the secure storage drive and the flash memory storage area. The first portion of firmware instructions may initiate execution upon connection of the secure storage drive to a computer device. Unless the computer device provides proper authentication information corresponding to the unhide information, the data access controller may block functional connection of the secure storage drive to the computer device and make the secure storage drive remain "hidden" to the operating system of the computer device. Alternatively, upon receipt of proper authentication information, functional connection of the secure storage drive to the computer device may be allowed such that the data access controller may further control access requests from the computer device (e.g., operating system of the computer device) to the flash memory storage area.

Other aspects of the embodiments described herein will become apparent from the following description and the accompanying drawings, illustrating the principles of the embodiments by way of example only.

BRIEF DESCRIPTION OF THE DRAWINGS

It being understood that the figures presented herein should not be deemed to limit or define the subject matter claimed herein, the applicants' disclosure may be understood by reference to the following description taken in conjunction with the accompanying drawings, in which like reference numerals identify like elements.

FIGS. 2A-B illustrate examples of removable plug-in storage drives including enhanced firmware for data integrity according to some disclosed embodiments.

FIG. 3 illustrates a block diagram 300 depicting a representation of a computer device using a layered model according to some disclosed embodiments.

NOTATION AND NOMENCLATURE

Figure 1A:
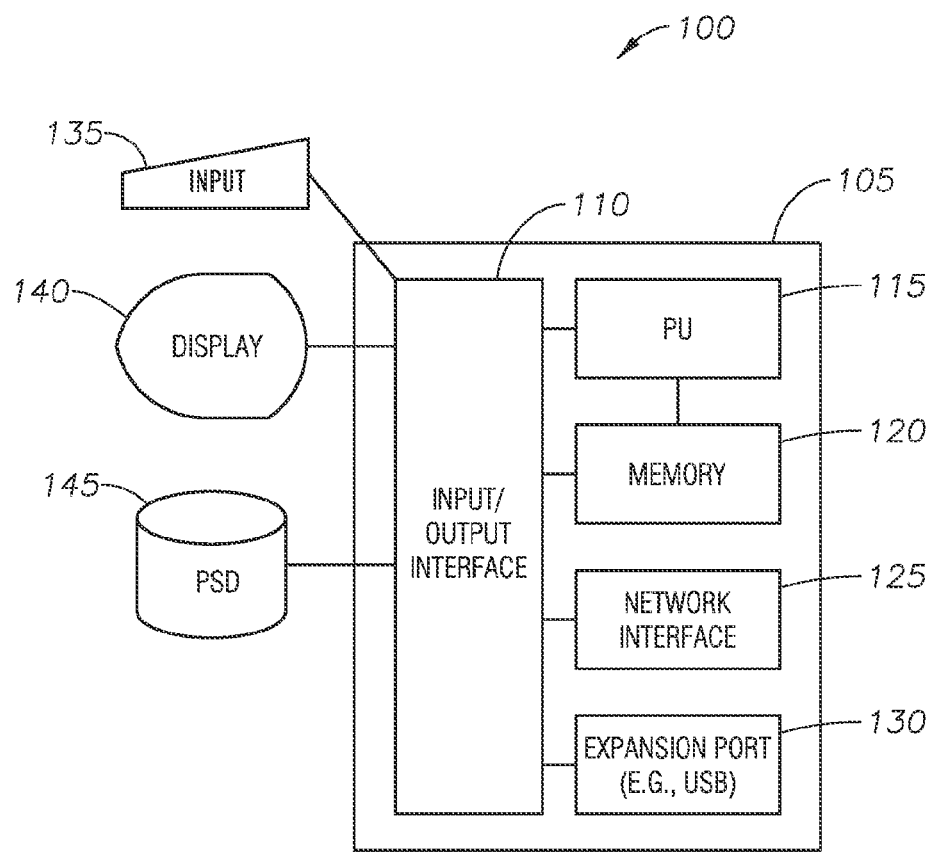
FIG. 1A illustrates an example high level architecture of a computing device in accordance with some disclosed embodiments.

Certain terms are used throughout the following description and claims to refer to particular system components and configurations. As one skilled in the art will appreciate, the same component may be referred to by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct connection. Thus, if a first device couples to a second device, that connection may be through a direct connection, or through an indirect connection via other devices and connections.

As used throughout this disclosure the terms "computer device" and "computer system" will both be used to refer to an apparatus that may be used in conjunction with disclosed embodiments of connectable storage drives. As used herein, a computer device may be thought of as having a subset of functionalities as compared to a computer system. That is, a computer device may refer to a special purpose processor-based device such as a digital video surveillance system primarily configured for executing a limited number of applications. A computer system may more generally refer to a general purpose computer such as a laptop, workstation, or server which may be configured by a user to run any number of off the shelf or specially designed software applications. Computer systems and computer devices will generally interact with disclosed storage drives in the same or similar ways.

This disclosure will also refer to storage devices and storage drives interchangeably. In general, a storage device/drive represents a medium accessible by a computer to store data and executable instructions. Also, throughout this disclosure reference will be made to "plugging in" a storage drive. It is noted that "plugging in" a storage drive is just one way to connect a storage drive to a computer device/system. This disclosure is not intended to be limited to drives that physically "plug in." As such, disclosed embodiments are also applicable to devices that are connected, for example by using a cable or by connecting to a computer bus. Additionally, references to "removable" storage are analogous to a device that may be connected and disconnected via cabled access to a device.

The terms "hidden" and "unhidden," when referring to a storage device, are used to describe accessibility of the storage device from a connected computer device or computer system. Hidden means that the operating system of the computer system cannot access, alter, or erase any data on the storage device, at least in part, because the operating system will be unaware of the existence of the storage device. Unhidden refers to a situation where a secure storage drive configured according to embodiments of this disclosure has been properly authenticated after connection to a computer system and is visible to the operating system of the computer system. Once "unhidden" the secure storage drive may interact with the operating system of the computer system in a standard manner until such time as the secure storage drive is disconnected. Upon being disconnected the secure storage drive may return to its default "hidden" state and remain inaccessible until it is again connected and "unhidden" via proper authentication.

DETAILED DESCRIPTION

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness. The same or similar parts may be marked with the same or similar reference numerals.

While various embodiments are described herein, it should be appreciated that the present invention encompasses many inventive concepts that may be embodied in a wide variety of contexts. The following detailed description of exemplary embodiments, read in conjunction with the accompanying drawings, is merely illustrative and is not to be taken as limiting the scope of the invention, as it would be impossible or impractical to include all of the possible embodiments and contexts of the invention in this disclosure. Upon reading this disclosure, many alternative embodiments of the present invention will be apparent to persons of ordinary skill in the art. The scope of the invention is defined by the appended claims and equivalents thereof.

Illustrative embodiments of the invention are described below in the context of a surveillance system for a police car and other computer devices that support collection and maintenance of video and audio evidence for law enforcement. Examples of such computer devices include, but are not limited to, portable digital cameras, self-contained application storage drives, digital video cameras, and digital audio microphones. Uses of the disclosed pre-configured storage device (e.g. a storage drive or secure storage drive) for securing data and maintaining data integrity exist beyond the field of law enforcement and this context is illustrative and not intended to be limiting in any manner. In the interest of clarity, not all features of an actual implementation are described for every embodiment disclosed in this specification. In the development of any actual embodiment, numerous implementation-specific decisions may need to be made to achieve the design-specific goals, which may vary from one implementation to another. It will be appreciated that such a development effort, while possibly complex and time-consuming, would nevertheless be a routine undertaking for persons of ordinary skill in the art having the benefit of this disclosure.

Referring to FIG. 1A, an example high level architecture of a computing device 100 in accordance with some disclosed embodiments is illustrated. Computing systems (e.g., computing device 100) may have many variations and may contain all components shown in FIG. 1A, a subset of those components, or additional components depending on different design criteria. In many cases, computing devices such as computing device 100 may be configured to connect to additional storage devices such as the secure storage drives disclosed herein. In one example, computing device 100 may be used to facilitate some of the disclosed functional capabilities of an integrated surveillance system for law enforcement. Example computing device 100 comprises a programmable control device (PCD) 105 which may be optionally connected to input device 135 (e.g., keyboard, mouse, touch screen, etc.), display 140 or programmable storage device (PSD) 145. Also, included with PCD 105 is a network interface 125 for communication via a network (either wired or wireless) with other computers and infrastructure devices (not shown). Note network interface 125 may be included within PCD 105 or be external to PCD 105. In either case, PCD 105 may be communicatively coupled to network interface 125. Also, note PSD 145 represents any form of non-volatile storage including, but not limited to, all forms of optical and magnetic storage elements including solid-state storage.

PCD 105 may be included in a computing system such as computing device 100 and be programmed to perform methods in accordance with this disclosure. PCD 105 comprises a processing unit (PU) 115, input-output (I/O) interface 110 and memory 120. PU 115 may include any programmable controller device including, for example, the Intel Core®, Pentium® and Celeron® processor families from Intel and the Cortex® and ARM® processor families from ARM® (INTEL® CORE®, PENTIUM® and CELERON® are registered trademarks of the Intel Corporation). CORTEX® and ARM® are registered trademarks of ARM Holdings. Memory 120 may include one or more memory modules and comprise random access memory (RAM), read only memory (ROM), programmable read only memory (PROM), programmable read-write memory, and solid state memory. It will also be recognized that PU 115 may further include some internal memory including, for example, cache memory.

Various changes in the materials, components, circuit elements, as well as in the details of the illustrated systems, devices and below described operational methods are possible without departing from the scope of the claims herein. For instance, acts in accordance with disclosed functional capabilities may be performed by a PCD (e.g., 105) executing instructions organized into one or more modules (comprised of computer program code or instructions). A PCD (e.g., 105) may include single computer processor (e.g., PU 115), a plurality of computer processors coupled by a communications link (e.g., bus or network) or one or more special purpose processors (e.g., a digital signal processor (DSP)). Such a PCD (e.g., 105) may be one element in a larger data processing system such as a general purpose or special purpose computer system. Storage media, as embodied in storage devices such as PSD 145, memory (e.g., 120) internal to PCD 105, or storage media connected via expansion port 130 are suitable for tangibly embodying computer program instructions. Storage media may include, but not be limited to: magnetic disks (fixed, floppy, and removable) and tape; optical media such as CD-ROMs and digital video disks (DVDs); and semiconductor memory devices such as Electrically Programmable Read-Only Memory (EPROM), Electrically Erasable Programmable Read-Only Memory (EEPROM), Programmable Gate Arrays, and flash devices. These types of storage media are also sometimes referred to as computer readable medium or program storage devices. PCD 105 and/ or computer device 100 may also include an expansion port 130 for connecting additional devices or storage media (e.g., plug-in storage drives 150 and 155 of FIGS. 1B and 1C). In one example, expansion port 130 may be a Universal Serial Bus (USB) port and allow for plug-in and removal of drives (e.g., 150 and 155) while computer device 100 is operational. Further details regarding plug-in or connectable storage drives that are "hot pluggable" will be discussed next with reference to FIGS. 1B and 1C.

Figures 1B, 1C:
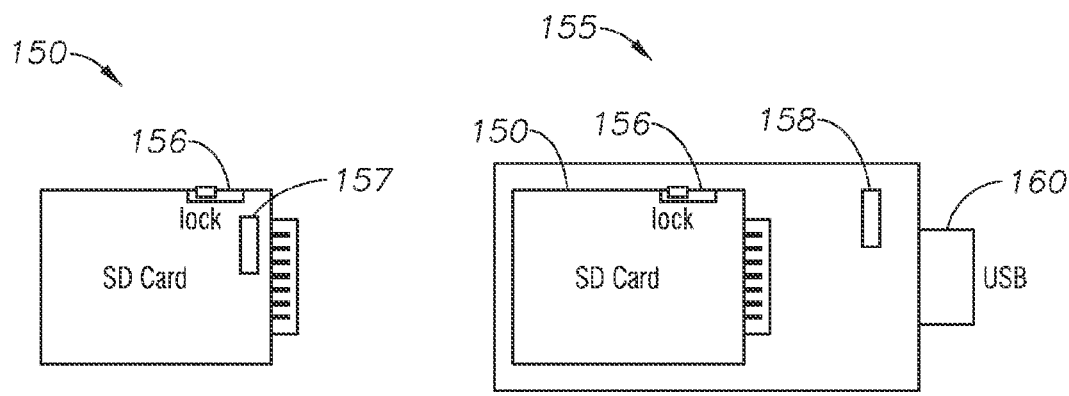
FIGS. 1B-C illustrate examples of removable plug-in storage drives which may be adapted for data integrity according to some disclosed embodiments.

FIGS. 1B to 1C illustrate examples of removable plug-in storage drives (150 and 155) according to some disclosed embodiments. Plug-in storage drive 150 illustrates an SD (Secure Digital) card. SD cards (e.g., 150) may have a lock switch 156 which, when in the lock position, puts the SD card 150 into a read-only state such that no data in the memory of the SD card 150 may be changed in any way (including protection against formatting). In addition to one or more internal mass storage specific flash memory chips (not shown), the SD card 150 may also include an on-card intelligent controller (block 157) having functionality that may be implemented using firmware instructions. The controller 157 typically manages interface protocols to allow access to the flash memory of SD card 150 and may also be used to implement, among other things, security algorithms for copyright protection, data storage and retrieval, as well as Error Correction Code (ECC) algorithms, defect handling and diagnostics, power management, and clock control.

FIG. 1C illustrates plug-in storage drive 155 in the form of a USB flash drive (also referred to as a flash drive, pen drive, thumb drive, or simply USB drive). A USB flash drive is a data storage device that includes flash memory (e.g., SD card 150) with an integrated Universal Serial Bus (USB) interface (e.g., 160) and its associated control logic 158 (e.g., firmware instructions). It will be noted that control logic 157 and 158 provide similar functionality for each of plug-in storage drives 150 and 155 respectively but are not necessarily (and likely not) the same set of instructions for different types of storage devices. USB flash drives (e.g., 155) are typically removable and rewritable, and physically much smaller than an optical disc (not shown). When a USB drive (e.g., 155) is plugged into a computer device (e.g., computer device 100) a process referred to as "enumeration" is typically initiated. Enumeration refers to an end-to-end process of making a USB drive (e.g., 155) accessible to a computer device and its operating system. The enumeration process includes identifying and assigning unique addresses to a plugged-in device and supports making USB drives "hot pluggable" (e.g., the drive may be plugged in without restarting of the computer device or computer system). A computer device (e.g., computer device 100) typically cannot fully communicate with or access the functionality of a USB drive (e.g., 155) until that device has been properly enumerated.

Referring now to FIGS. 2A-B, storage devices 250 and 255 are similar in functionality to storage drives 150 and 155. However, they are depicted as having added security modules 270 and 271. Security modules 270 and 271 may be incorporated into pre-existing control logic (e.g., 157 and 158) or may be implemented as an additional layer of instructions. In either case, security modules 270 and 271 represent a modification to standard interface protocols for access to memory modules on their respective protected storage devices 250 and 255. Security modules 270 and 271, according to some disclosed embodiments, further protect the integrity of data access to memory modules of the disclosed protected storage devices 250 and 255 by implementing the disclosed additional level(s) of authentication required for access by an operating system of a computer system (e.g., computer device 100) as discussed further below. It will be noted that when lock switch 156 is in the locked position for protected storage devices 250 and 255, lock switch 156 performs its normal function of making the storage device read-only, however, security modules 270 and 271 may further prevent any access to data by keeping the storage device (e.g., 250, 255) "hidden" as explained further below.

FIG. 3 illustrates a block diagram 300 depicting a representation of a simplified layered model with functional units at each level of a computer device to assist in describing aspects of embodiments of a secure storage drives in accordance with this disclosure. Each of the functional units in a level typically interfaces only with the next adjoining level such that levels are not bypassed. Bypassing of levels may pose security risks and therefore designers of computer systems adhere to a model as shown in block diagram 300 (or a similar model). User 305 (e.g., a human user of a computer device) is positioned at the highest level (level 5) of this model. At the lowest level (level 1), the physical hardware 330 is represented. From the bottom up, starting at physical hardware 330, hardware components of a computer system (e.g., computer device 100 of FIG. 1) communicate with device drivers 325. Device drivers 325 are configured to understand how to communicate with each piece of physical hardware and provide an interface to the operating system 320 (level 3). Without a device driver (e.g., 325), an operating system 320 would have to incorporate device specific code to be able to interact with a particular hardware device. For the purposes of this disclosure, device drivers 325 at level 2 are not considered part of the operating system 320 at level 3. That is, even if a device driver 325 has awareness of a particular piece of physical hardware (330 at level 1) and has not allowed access to the operating system 320 at level 3, it is considered that the particular piece of hardware is not accessible to the operating system 320 or any of its commands. In other words, a particular piece of physical hardware at level 1 that has not been made accessible to operating system 320 at level 3 would remain "hidden" to the operating system 320. To complete the model discussion, command shell 310 and applications 315 provide an interface between a user 305 of the computer system and the operating system level 320. In general, command shell 310 and applications 315 provide user 305 with access to functionality being provided by a computer device (e.g., computer device 100).

Figure 4:
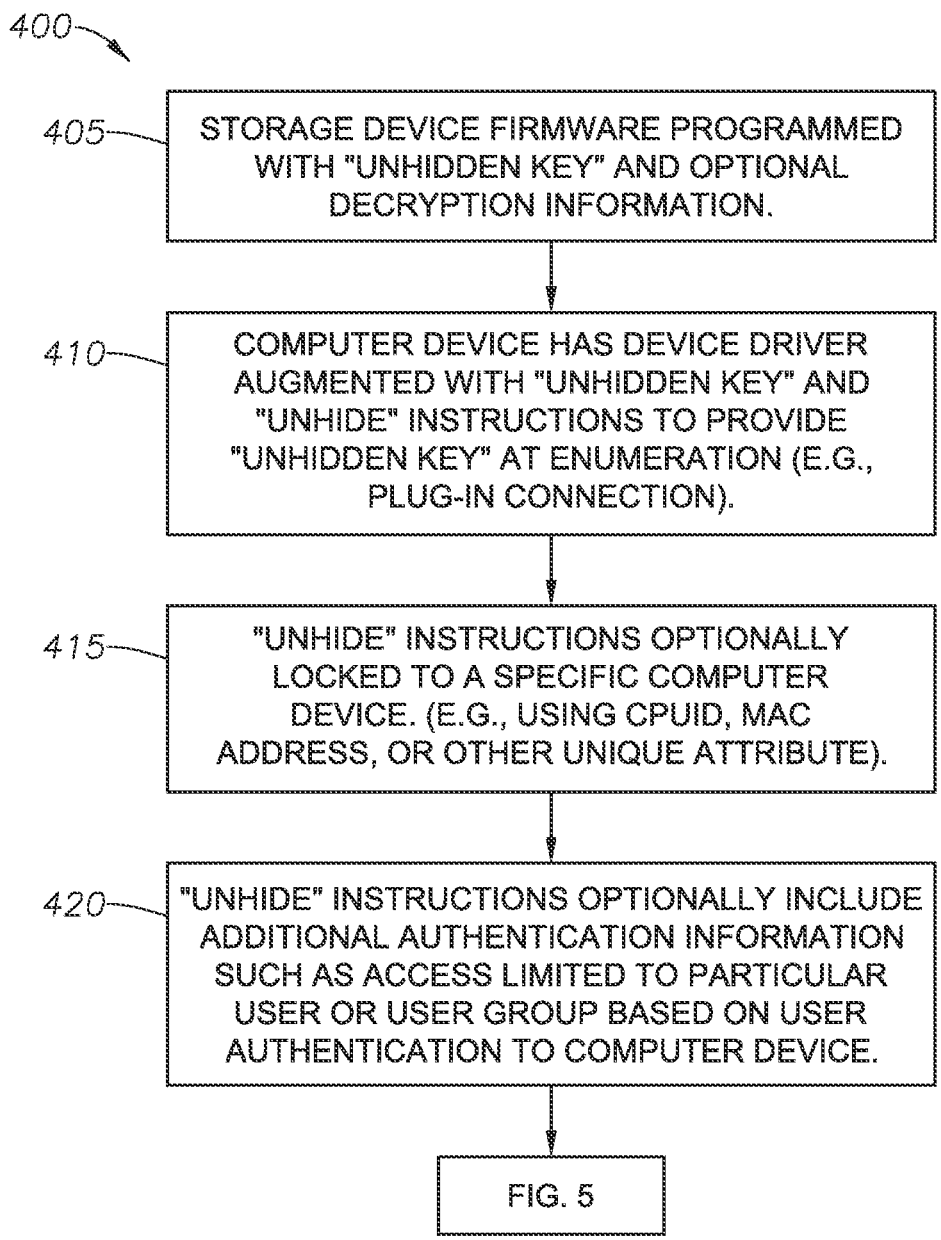
FIG. 4 illustrates a possible process flow 400 to configure a computer device and a removable secure storage drive according to some disclosed embodiments.

Referring now to FIG. 4, process flow 400 illustrates one possible method of configuring a computer system (e.g., computer device 100) and a secure removable storage device (e.g., 250 and 255) according to some disclosed embodiments. Because of requirements of law enforcement policies and procedures, access to and modification of data collected in the line of duty must be strictly controlled. One example requirement is that a "chain of custody of evidence" must be maintained. Chain of custody, in legal contexts, refers to chronological documentation or audit trails, showing the seizure (e.g., recording), custody, control, transfer, analysis, and disposition of physical or electronic (e.g., digital video/audio data) evidence. When evidence may be used in court to convict persons of crimes, it must be handled in a careful manner to avoid later allegations of tampering or misconduct which may compromise the case. The disclosed secure removable storage devices (e.g., 250 and 255), in conjunction with other aspects of law enforcement computer systems, may be used to assist in maintaining a proper chain of custody. Beginning at block 405, a storage device such as storage devices 250 and 255 may have its firmware updated or receive additional firmware instructions such as being programmed with an "unhidden key" and optionally decryption information. The decryption information mentioned here relates to the function of decrypting the "unhidden key" and may or may not relate to encryption of any other data on the secure storage drive. At block 410, a computer device (e.g., computer device 100 of FIG. 1) may have its device driver augmented or replaced such that the device driver may supply one or more defined "unhidden key(s)" upon detection of a storage device. In one example embodiment, the device driver supplies the "unhide" information in encrypted form to further enhance security of the unhide information itself. At block 415, the unhide instructions (or the updated device driver itself) may be "locked" to a specific computer device. Locking this information to a specific computer device may further protect against copying of the device driver and unhide information to a different computer device than the one that has initially been configured for access to a corresponding storage device. Locking of the device driver and/or unhide information to a particular computer device may be performed by ensuring that the command associated with providing the unhide information only function properly after they have verified an attribute of the computer system at execution time. For example, the commands may check one or more of: a Central Processing Unit Identifier (CPUID), a media access control (MAC) address of a network card associated with a computer system, or some other unique or predetermined attribute of the computer system. At block 420, the unhide information may be further configured to optionally include additional authentication information prior to allowing access to a secure storage drive (e.g., 250 and 255). The additional information may include user identification (UID), user group identification (GID), or the like. In this example embodiment, a secure storage drive will only become unhidden when plugged into (e.g., connected to) a computer device that has the proper unhide information and only while a proper user is authenticated to the computer device. This may prevent, for example, access to information on a secure storage drive from a properly configured computer device by an improper user. Such two-factor authentication thus requires that both the storage device and the officer pass authentication (i.e. the officer is a proper user) prior to the secure storage drive becoming "unhidden" and accessible.

As explained above, a device driver on a computer device such as computer device 100 may be augmented or replaced to include additional or altered instructions to provide the disclosed unhide information. The device driver may be altered by changing instructions internal to the original device driver, by providing an altered dynamic load library (DLL), by installing a new device driver, or by many other implementation specific methods. This disclosure does not confine itself to any one method of implementation for updating a computer system to have a device driver enabled to provide the appropriate unhide information. Additionally, augmentation of a device driver on a computer device may include providing multiple different combinations and permutations of unhide information for a single computer device. That is, a single computer device may be configured to be able to access and unhide a plurality of different secure storage drives based on properly providing any required secondary authentication information (e.g., UID, GID).

Figure 5:
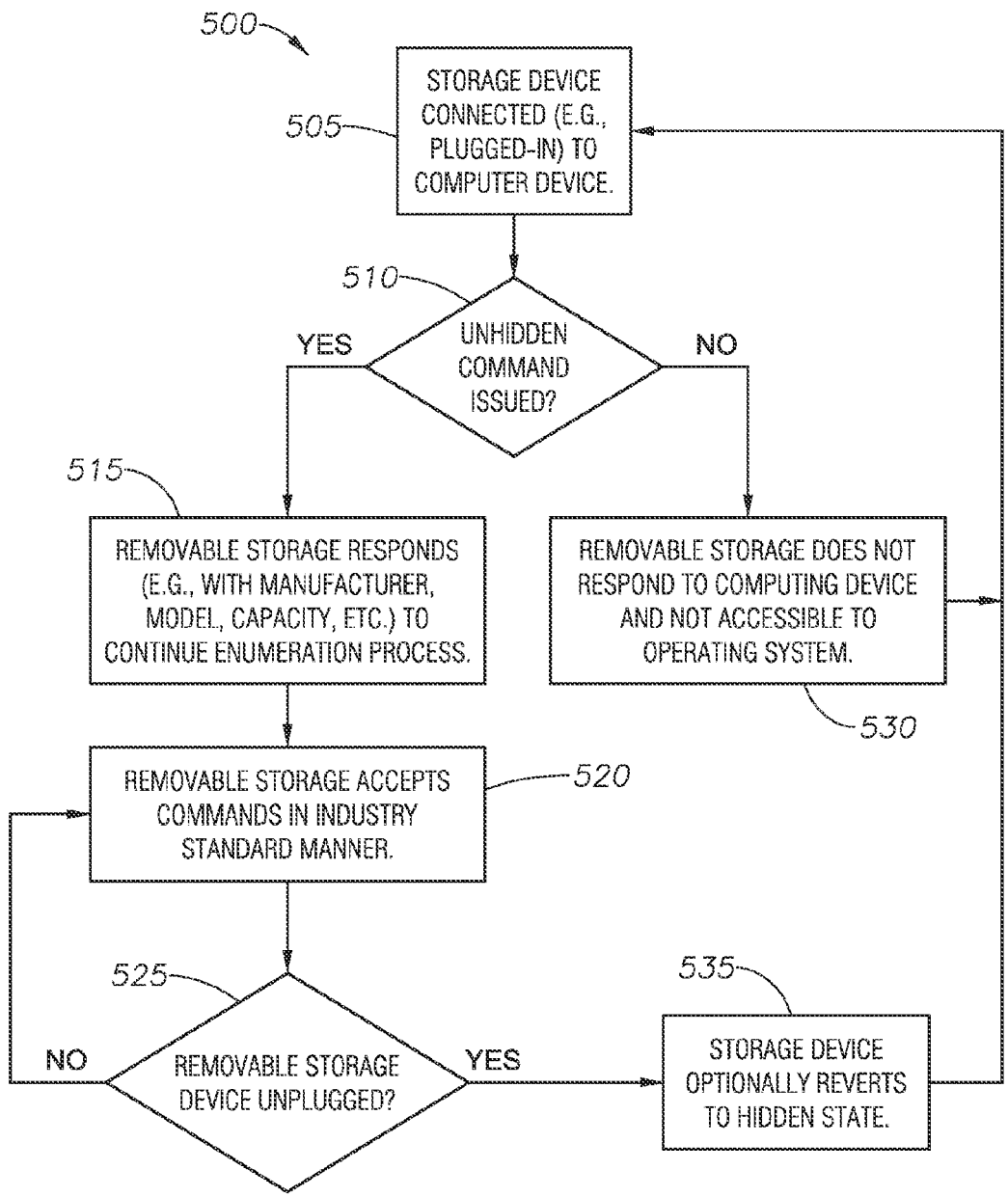
FIG. 5 illustrates a possible process flow 500 to authenticate a computer device and a removable secure storage drive according to some disclosed embodiments.

Referring now to FIG. 5, flow chart 500 illustrates a possible method for determining if any computer access should be permitted to a secure storage drive (e.g., 250, 255). If allowed, access may use typical industry standard "plug-n-play" storage device protocols. Disclosed industry standard storage devices may include SD drives, SATA devices, SCSSI devices, or any other type of device suitable for the many disclosed embodiments. By disabling access to a "secured" but otherwise industry standard plug-n-play storage device, protection may be extended beyond typical encryption of data or read-only access to data. For example, on a standard plug-n-play storage device, even if data on the device is encrypted and the content is not accessible, a "FORMAT" command may be able to erase the stored data. As explained above, such destruction of data may not be acceptable for law enforcement type data. The architecture of the apparatus, methods, and systems disclosed herein makes such unauthorized attempts to format a device impossible because the device remains hidden and not accessible. Accordingly, prevention of the ability to format a storage device and to destroy data on a storage device may be an advantage for disclosed embodiments of the secure storage drive used in conjunction with other systems such as the audio/video surveillance system for collecting legal evidence as described herein, as well as other applicable fields. Beginning at block 505, a plug in storage device is inserted into a port on a computer device (e.g., computer device 100 of FIG. 1, or computer device 601 of FIG. 6) or connected via another means such as a bus. In typical operation, the device driver of the computer device would query the storage device and the storage device would respond with appropriate access protocols (see enumeration discussion above). However, a removable storage device configured in accordance with some embodiments of this disclosure may have specially configured firmware to prevent standard "hand shake" protocols (e.g., enumeration processes) from allowing access to the storage area of a secure storage drive (e.g., 250, 255). At decision 510, it is determined by the specially configured firmware of the storage device if an unhidden command from the device driver of the computer device has been received by the storage device. The unhidden command and optionally proper additional authentication information is required to allow access to the storage area of the secure storage drive (e.g., 250, 255) or to allow access from the operating system of the computer device (e.g., computer device 100 of FIG. 1, or computer device 601 of FIG. 6) (or connected via another means such as a bus or cable). If no unhidden command has been received at the secure storage drive, the NO prong of decision 510, then the secure storage drive (e.g., 250, 255) does not respond in such a way as to complete a proper enumeration. Thus, the operating system of the computer device (e.g., computer device 100 of FIG. 1, or computer device 601 of FIG. 6) will not recognize the secure storage drive. Optimally, the operating system will not even inform a user via the user interface of the computer device that any type of device was plugged in. In any event, even rudimentary access to the secure storage drive will be prevented as shown at block 530. That is, even rudimentary access to information about the secure storage drive will not be allowed. Flow will return to block 505 as if no plug-n-play device was inserted into the port of the computer device (e.g., computer device 100 of FIG. 1, or computer device 601 of FIG. 6). Alternatively, an "unhidden" command may have been issued by the device driver of the computer device to allow initial access to the storage device (the YES prong of decision 510) and then allow access by the operating system of the computer device (e.g., computer device 100 of FIG. 1, or computer device 601 of FIG. 6) (or connected via another means such as a bus or cable). At block 515, the specially configured secure storage drive will respond to the operating system in a "normal" fashion with access information as required to complete the enumeration process and permit access, as allowed by other security measures, to data on the removable storage device (shown at block 520). At decision 525 it is determined if the removable storage device has been unplugged. If the storage device has been unplugged (YES prong of decision 525), flow continues to block 535 where the secure storage drive may revert to its default hidden state. Flow then returns to the initial condition of block 505. Otherwise (NO prong of decision 525), flow returns to block 520 and continued access is permitted as long as the device remains plugged in. Note that data on the storage device may be further encrypted or otherwise protected by additional methods including simple password protection, biometric access control, etc. as known in prior art storage devices. Additionally, in an "open" embodiment, if a typical removable storage device were plugged into the computer device, the computer device would simply ignore (and not require) the "unhidden" command and therefore be accessible to the computer device in the normal fashion. In a different "closed" embodiment the computer device and its device driver may not allow access to any removable storage that is not secure. That is, rather than allowing standard access as in the "open" embodiment, the "closed" embodiment would restrict access to only specially configured secure storage drives. The "closed" embodiment may be useful, for example, to deter transfer of data from the computer device to a non-secure storage device because data on the computer device is access restricted.

According to some disclosed embodiments, the secure storage drive remains hidden unless the computer system issues a special command (via a device driver) to unhide the storage volume [e.g., the portion of the storage device containing data readable by an operating system of the computer device (e.g., computer device 100 of FIG. 1, or computer device 601 of FIG. 6)]. The special command may be issued from a modified device driver incorporated into the computer device or may be an additional hardware feature of the plug-in port (e.g., port 130 of FIG. 1) for industry standard devices. If the computer device does not have the ability to issue the unhidden command, the secure storage drive will not respond to any queries from the operating system of the computer device—the secure removable storage device may be treated as if it does not exist. Thus, the files in storage device are not visible in any way to the computer device. In addition to the disclosed aspect of hiding the plug-in storage itself, the data files on the plug-in storage can be encrypted for further security file protection. As noted above, commonly used encryption methods are unable to prevent computer systems from accessing and deleting the files (e.g., through a system "FORMAT"). However, unlike traditional data encryption, the hidden volume method described herein not only protects data integrity but also eliminates any possibility of computers accessing the data without the unhidden key command.

The hidden secure removable storage device and associated methods of operation described above with reference to FIG. 5 may be used as discussed for law enforcement information or to secure any sensitive information in any field, including, but not limited to, medical, financial, Social Security, Protected Health Information (PHI), and so on.

Figure 6:
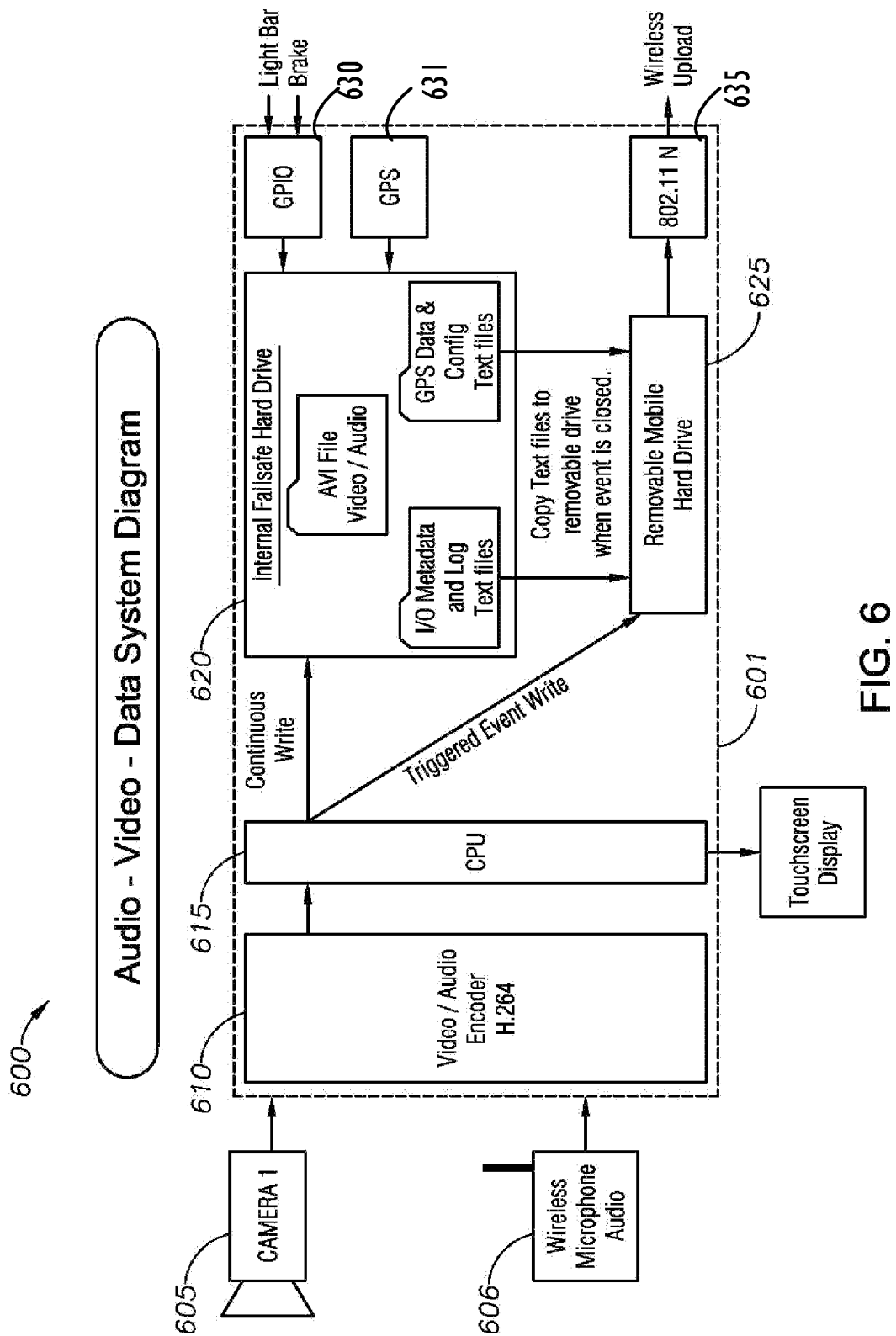
FIG. 6 illustrates a block diagram 600 of an audio-video-data system that may be used, for example by law enforcement as a surveillance system, with one or more embodiments of the disclosed secure storage drive.

Referring now to FIG. 6, block diagram 600 illustrates different functional components of a surveillance system, such as an in-car audio/video digital video recorder, that may be used by law enforcement to collect evidence. One component of such a surveillance system typically includes a computer device (illustrated in FIG. 6 by dashed line 601) containing components similar to computer device 100 of FIG. 1. Note that each of the components shown in block diagram 600 may be communicatively coupled to other components via communication channels (e.g., bus) not shown in the block diagram. The flow arrows of block diagram 600 are very general in nature. In use, video and audio may be captured by camera 605 and microphone 606 respectively. Captured data may be provided initially to video/audio encoder 610 to encode and optionally compress the raw video data and the encoded data may be stored in a memory area (not shown) for access by CPU 615. Encoded data may also be selectively stored to either hard drive 620 or removable mobile hard drive 625 individually or to both simultaneously. Removable mobile hard drive 625 may be a secure storage drive such as 250 and 255. Data may also be transferred, for example at the direction of a user, from hard drive 620 to removable hard drive 625. Data capture devices such as general purpose input output (GPIO) 630 and Global Positioning System (GPS) 631 may be used to capture metadata to associate with captured surveillance information. All pertinent captured metadata may be associated with captured video/audio recordings using structured text files such as, for example, eXtensible Markup Language (XML) files. In addition to captured metrics provided by real-time capture inputs, XML files may be utilized to store many different types of metadata associated with captured video and data, including but not limited to timestamps of capture (internal clock (not shown) of system 600 may be synchronized using GPS data), event tags, GPS coordinates, GPS and RADAR/LIDAR measurement from a target vehicle, analytical information and so on. Wireless interface 635 (or a wired interface (not shown) when available) may be used to upload information from one or more surveillance systems to back office servers located, for example, at a police station or to cloud based resources. The disclosed secure removable storage device (e.g., 250, 255) may be used to protect and restrict access to the captured audio, video, and metadata as required by evidentiary rules followed by law enforcement.

Figure 7:
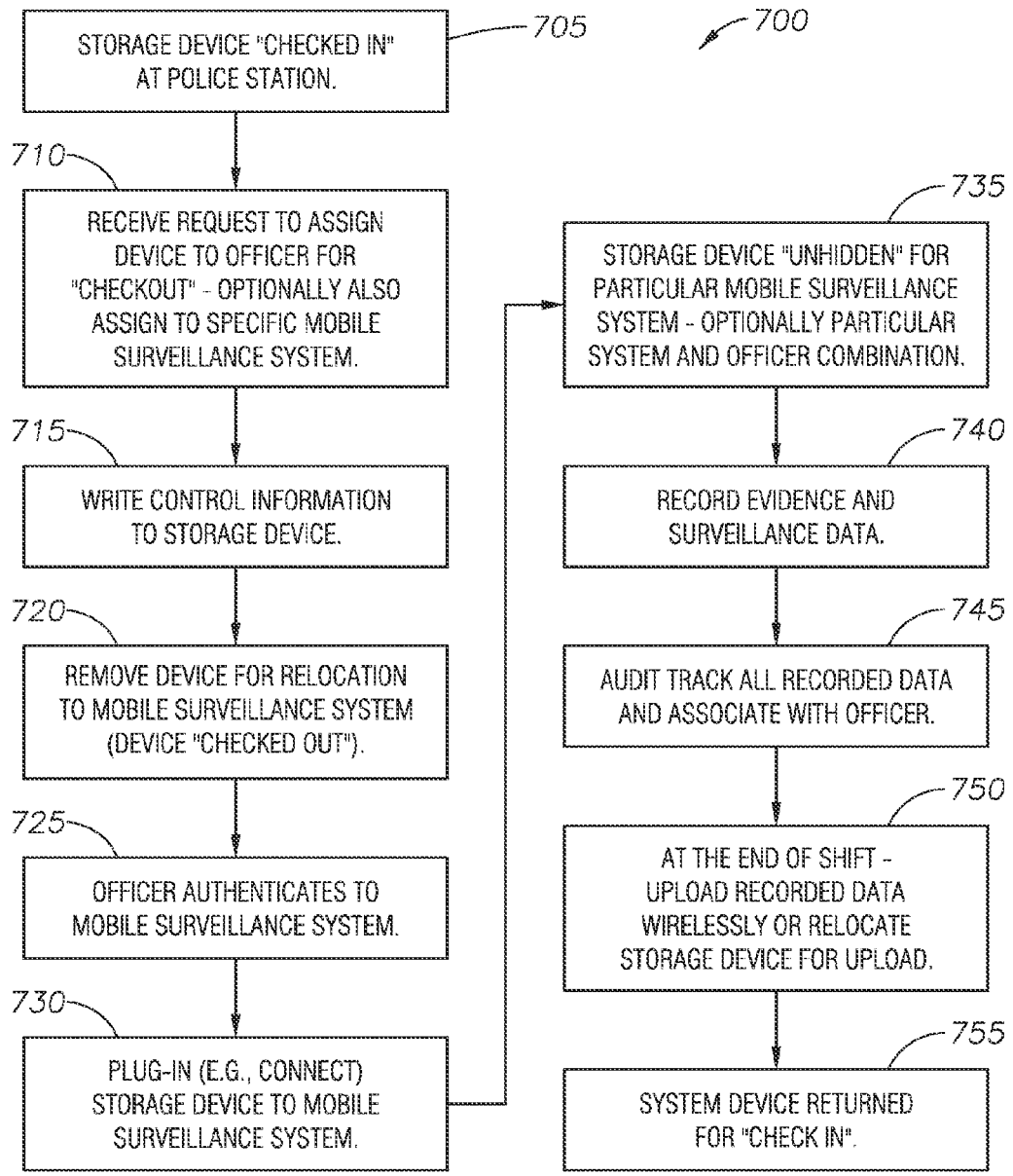
FIG. 7 illustrates a possible process flow 700 to "checkout" a secure storage drive that may be used by specific law enforcement personnel for the duration of checkout and assist in chain of custody procedures according to some disclosed embodiments.

Referring now to FIG. 7, process flow 700 illustrates a possible method for assisting law enforcement personnel with compliance of chain of custody requirements of legal evidence. In this example, the computer system at the police station will be referred to as a "workstation" and a computer device in a police car, for example, will be referred to as a "mobile surveillance system." Both the workstation and the mobile surveillance system are examples embodiments of computer device 100 of FIG. 1 described above. Also, in this example the storage device may be referred to as a secure storage drive in certain situations, however, aspects of this example are clearly applicable to a standard storage device and may be beneficial independently of a specially configured secure storage drive. Beginning at block 705 a storage device (e.g., secure storage drive 250, 255) is "checked in" at a police station, for example. In the "checked in" state the storage device may be connected to a workstation that is configured to interact with the storage device in an "unhidden" manner. That is, the storage device may be connected to a workstation configured with the required information explained above to allow access by the operating system to a secure storage drive. At block 710, the workstation receives a request to assign a storage device to an officer (e.g., officer "Joe") for use in a patrol "shift." Optionally, the request may also include information to assign the storage device to a particular mobile surveillance system for that shift (e.g., surveillance system of "patrol car 54"). At block 715, the workstation writes control information to the storage device. The control information may include storage serial number, officer's ID (e.g., "Joe"), patrol car (e.g., "54"), officer's password (likely encrypted), recording parameter settings, or other information useful in assisting in audit tracking of the storage device and any information collected on the storage device during the shift. At block 720, the storage device is removed from the workstation for relocation to a mobile surveillance system. The storage device is now in a "checked out" state. At block 725, the officer authenticates to a mobile surveillance system. The storage device is plugged in (e.g., connected) to the mobile surveillance system at block 730. Flow continues to block 735 where the storage device, if a secure storage drive (e.g., 250, 255), is unhidden. Clearly, a secure storage drive will only become unhidden if the mobile surveillance system is configured to properly authenticate to the secure storage drive. Authentication requires the mobile surveillance system be pre-configured to access this particular secure storage drive using "unhide information" as described above and may optionally only unhide after a second check that a proper officer has authenticated to the mobile surveillance system. That is, both the secure storage drive is associated with a proper surveillance system, and the authenticated user will be validated as a proper user prior to allowing any access to the secure storage drive from the mobile surveillance system. Thus, as an example, Officer "Joe Smith" is authenticated to the mobile surveillance system and the mobile surveillance system is the one in patrol car 54, that officer Smith should be using for his shift. At block 740, as the officer performs his shift duties (e.g., goes on patrol, etc.) the mobile surveillance system records and stores evidence and surveillance data onto the storage device. During the shift, all data recorded on the storage device may be associated with the officer for audit tracking purposes as indicated at block 745. For example, a metadata file may be used to "mark" any recorded data with officer's ID, event type, date/time, GPS location, etc. Block 750 represents actions that may take place at the end of a shift, for example. After a shift is completed and the officer and mobile surveillance system return to the police station, recorded data may be securely (for example, but not limited to, by data encryption) uploaded wirelessly to a back office system at the police station. Securely uploaded, as used here, indicates that the recorded data will be uploaded in a manner as to maintain its association with the officer and maintain chain of custody requirements as well as any other type of security regarding the wireless network, etc. As an alternative to wireless upload, the officer may remove (e.g., disconnect) the storage device and relocate the storage device to the same or a different workstation for upload at the police station. Clearly, a different workstation would also need to be properly configured to access the storage device if it is a secured storage device. At block 755, the officer may "check in" the storage device so as to allow a different officer to use it on a subsequent shift, for example. Note that some law enforcement agencies require a two-factor authentication for access to data. Validating "unhidden information" regarding both the storage device and the authenticated officer (e.g., both the association with the surveillance system of patrol car 54 and confirming "Joe" is logged into that system) is one example of two-factor authentication (as also disclosed heretofore).

In light of the principles and example embodiments described and illustrated herein, it will be recognized that the example embodiments can be modified in arrangement and detail without departing from such principles. Also, the foregoing discussion has focused on particular embodiments, but other configurations are also contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable (unless otherwise stated) with any one or more of the other embodiments referenced herein, and any number of features of different embodiments are combinable with one another, unless indicated otherwise.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, and processes in which the individual operations disclosed herein are combined, subdivided, rearranged, or otherwise altered.

This disclosure may include descriptions of various benefits and advantages that may be provided by various embodiments. One, some, all, or different benefits or advantages may be provided by different embodiments.

In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

What is claimed is:

1. A storage device for storing data, the storage device comprising:
    a secure storage drive including a flash memory storage area;
    a first portion of firmware instructions pertaining to access to the secure storage drive, the first portion of firmware instructions having access to unhide information stored on the secure storage drive, the unhide information pertaining to unhiding the secure storage drive;
    a second portion of firmware instructions pertaining to access to the flash memory storage area; and
    a data access controller configured to utilize the first and second portions of firmware instructions to control access to the secure storage drive and the flash memory storage area;
    wherein the first portion of firmware instructions comprise instructions that initiate execution upon connection of the secure storage drive to a computer device, and prevent completion of an enumeration process of the secure storage drive with the computer device unless the computer device provides proper authentication information upon a start of the enumeration process of the secure storage drive with the computer device, the proper authentication information corresponding to the unhide information, and
    wherein upon receipt of the proper authentication information, the first portion of firmware instructions allows completion of the enumeration process of the secure storage drive with the computer device and allow the second portion of firmware instructions to control access requests from the computer device to the flash memory storage area.

2. The storage device of claim 1, further comprising a USB interface for connection to the computer device.

3. The storage device of claim 1, wherein the first portion of firmware instructions execute prior to the second portion of firmware instructions.

4. The storage device of claim 1, wherein the first portion of firmware instructions execute prior to the second portion of firmware instructions, the first portion of firmware instructions comprising instructions to decrypt at least a portion of authentication information provided by the computer device.

5. The storage device of claim 1, wherein the authentication information comprises two-factor authentication information, and the two-factor authentication information comprises information identifying a user previously authenticated to the computer device.

6. The storage device of claim 1, wherein the authentication information comprises information including biometric access control to identify a user.

7. The storage device of claim 1, wherein the first portion of firmware instructions and the second portion of firmware instructions are (i) integrated as a single set of firmware instructions, and/or (ii) integrated with other firmware instructions executed by the data access controller.

8. The storage device of claim 1, wherein the flash memory storage area comprises an area of memory on a secure digital card.

9. The storage device of claim 1, wherein data in at least a portion of the flash memory storage area is encrypted.

10. The storage device of claim 1, wherein the first portion of firmware instructions execute prior to the second portion of firmware instructions, the first portion of firmware instructions comprising instructions to decrypt at least a portion of authentication information provided by the computer device using a first decryption key; and wherein data in at least a portion of the flash memory storage area is encrypted using a different decryption key than the first decryption key.

11. The storage device of claim 1, wherein the storage device comprises a removable storage device that is capable of being plugged in to the computer device.

12. The storage device of claim 1, wherein the preventing of completion of the enumeration process is not contingent upon one or more previous attempts to authenticate.

13. A computer system configured to access a secure storage drive, the computer system comprising:
an operating system;
a memory for loading the operating system thereto;
a processor for executing the operating system; and
one or more device drivers, the one or more device drivers providing an interface between physical hardware and the operating system;
wherein a first of the one or more device drivers comprises instructions to interface with a secure storage drive, the instructions to interface comprising instructions to cause the first device driver to:
initiate execution on the processor upon detection of connection of a device that may later be determined to be the secure storage drive;
determine whether or not the device is the secure storage drive;
provide, upon a start of an enumeration process of the secure storage drive with the computer system, unhide information to the secure storage drive based on a determination that the device is the secure storage drive;
receive a response at the processor from the secure storage drive after providing the unhide information; and
provide an interface between the operating system and the secure storage drive if the received response passes one or more authentication criteria, the interface allowing access to a data storage area on the secure storage drive, wherein completion of the enumeration process of the secure storage drive with the computer system is prevented unless the received response passes the one or more authentication criteria.

14. The computer system of claim 13, wherein the computer system comprises a special purpose computer device configured as a mobile surveillance system.

15. The computer system of claim 13, wherein the instructions to interface with the secure storage drive comprise instructions locked for execution on a specified computer system.

16. The computer system of claim 15, wherein the instructions locked for execution on the specified computer system comprise instructions locked for execution using a central processing unit identification (CPUID) or a media access control (MAC) address.

17. The computer system of claim 13, wherein the instructions to interface with the secure storage drive further comprise instructions to prevent access to the device based on a determination that the device is not the secure storage drive.

18. The computer system of claim 13, wherein the instructions to interface with the secure storage drive further comprise instructions to prevent all access by the operating system to the secure storage drive if the received response fails one or more of the authentication criteria.

19. The computer system of claim 13, wherein the instructions to cause the first device driver to provide unhide information comprise instructions to cause the first device driver to provide at least a portion of the unhide information as encrypted information.

20. The computer system of claim 13, wherein the computer system is configured to transmit metadata to the secure storage drive, assuming the received response has passed the one or more authentication criteria and the interface between the operating system and the secure storage drive has been provided, the metadata comprising information associating audio and/or video data with either a user and/or a device, the audio and/or video data having been stored or to be stored on the secure storage drive, and the user and/or device having been assigned to the secure storage drive and having been authenticated by the computer system and/or the secure storage drive.

21. The computer system of claim 13, wherein the preventing of completion of the enumeration process is not contingent upon one or more previous attempts to authenticate.

22. A non-transitory computer readable medium comprising instructions stored thereon that when executed by a processor cause the processor to configure one or more device drivers on a computer system or computer device, the one or more device drivers providing an interface between physical hardware and an operating system;
wherein a first of the one or more device drivers comprises instructions to interface with a secure storage drive, the instructions to interface comprising instructions to cause the first device driver to:
initiate execution upon detection of connection of a device that may later be determined to be the secure storage drive;
determine whether or not the device is the secure storage drive;
provide, upon a start of an enumeration process of the secure storage drive with the operating system, unhide information to the secure storage drive based on a determination that the device is the secure storage drive;
receive a response from the secure storage drive after providing the unhide information; and provide an interface between the operating system and the secure storage drive if the received response passes one or more authentication criteria, the interface allowing access to a data storage area on the secure storage drive, wherein completion of the enumeration process of the secure storage drive with the operating system is prevented unless the received response passes the one or more authentication criteria.

23. The non-transitory computer readable medium of claim 22, wherein the preventing of completion of the enumeration process is not contingent upon one or more previous attempts to authenticate.

* * * * *